United States Patent [19]

Suzumura

[11] Patent Number: 4,723,136

[45] Date of Patent: Feb. 2, 1988

[54] PRINT-ON-DEMAND TYPE LIQUID JET PRINTING HEAD HAVING MAIN AND SUBSIDIARY LIQUID PATHS

[75] Inventor: Masamichi Suzumura, Kamakura, Japan

[73] Assignee: Canon Kabushiki Kaisha, Tokyo, Japan

[21] Appl. No.: 794,150

[22] Filed: Nov. 1, 1985

[30] Foreign Application Priority Data

Nov. 5, 1984 [JP] Japan ................................ 59-231246
Nov. 5, 1984 [JP] Japan ................................ 59-231247

[51] Int. Cl.[4] ................................ G01D 15/16
[52] U.S. Cl. ................................ 346/140 R
[58] Field of Search ................................ 346/140

[56] References Cited

U.S. PATENT DOCUMENTS

| | | | |
|---|---|---|---|
| 4,024,544 | 5/1977 | Vernon | 346/140 X |
| 4,334,234 | 6/1982 | Shirato | 346/140 |
| 4,424,520 | 1/1984 | Matsuda | 346/140 |
| 4,435,721 | 3/1984 | Tsuzuki | 346/140 |
| 4,509,063 | 4/1985 | Sugitani | 346/140 |
| 4,549,191 | 10/1985 | Fukuchi | 346/140 |

*Primary Examiner*—Joseph W. Hartary
*Attorney, Agent, or Firm*—Fitzpatrick, Cella, Harper & Scinto

[57] ABSTRACT

A liquid jet recording head comprising a liquid emitting port for liquid emission and liquid paths communicating with said liquid emitting port, wherein said liquid paths comprise a main liquid path and a subsidiary liquid path, wherein said main liquid path is provided with an energy generating member positioned along said main liquid path and adapted for generating energy to be utilized for liquid emission, and wherein said subsidiary liquid path communicates with said main liquid path in the downstream side thereof including the position of said energy generating member.

12 Claims, 12 Drawing Figures

PRINT-ON-DEMAND TYPE LIQUID JET PRINTING HEAD HAVING MAIN AND SUBSIDIARY LIQUID PATHS

BACKGROUND OF THE INVENTION

1. Field of the Invention

The present invention relates to a liquid jet recording head which forms liquid droplets by emitting liquid, for the purpose of image recording.

2. Description of the Prior Art

Non-impact recording methods are attracting attention in that noise at recording is negligibly low. Among such methods, a liquid jet recording method (ink jet recording method) is particularly promising in that it is capable of high-speed recording on plain paper without a particular fixing step. For this reason, there have been proposed various working principles and corresponding devices, some of which are already in commercial application while others are still in the course of development.

Among such ink jet recording methods, a method disclosed in the Japanese Patent Laid-open Sho No. 54-51837 and the German Patent Laid-open (DOLS) No. 2843064 is different from others in that the force for forming flying liquid droplets is obtained by thermal energy applied to liquid.

According to the description of the above-mentioned patent specifications, liquid receiving the thermal energy causes a state change involving a rapid volume increase, including formation of bubbles, thereby emitting liquid droplets from an orifice of a recording head tip, and said droplets fly and attach to a recording member to form a recording thereon.

Particularly the ink jet recording method disclosed in the DOLS No. 2843064 is not only effectively adaptable to a so-called drop on demand recording method but also can be realized easily into a full-line multi-orifice recording head of a high density, thus enabling providing an image with high resolution power and high quality with a high speed.

FIG. 1 (A) is a schematic perspective view of a conventional liquid jet recording head, and FIG. 1 (B) is a cross-sectional view thereof along a line A—A in FIG. 1 (A). A head 101 comprises a substrate 103 equipped thereon with electrothermal converting members 102 for generating the liquid emitting energy, wall members 104 joined thereon and a plate member 105 joined thereon to form liquid flow paths 106 and a liquid chamber 107, into which a recording liquid is supplied through a liquid supply entrance 108 formed in said plate member 105. Thermal energy caused by said electrothermal converting member 102 on the substrate 103 through electric power supply to said converting member is transferred to the recording liquid occupying the liquid flow path 106 to generate bubbles in the recording liquid, and the resulting rapid volume increase causes the recording liquid to be emitted from a liquid emitting port 109 at the end of said liquid flow path 106, thus generating flying liquid droplets. In such process, the liquid emitting force is significantly affected by the balance of flow resistances in the flow path in front of and behind the electrothermal converter 102 functioning as a thermal energy generator in the liquid flow path 106. More specifically, in order to effectively utilize, as the liquid emitting energy, the pressure increase in the liquid flow path 106 caused by the volume change of the bubbles on said thermal energy generator, and to minimize the loss of said pressure increase resulting from pressure dissipation into the liquid chamber 107, it is necessary to design the liquid flow path between the thermal energy generator and the liquid chamber 107 longer than the flow path between said thermal energy generator and the liquid emitting port 109, thus increasing the flow resistance in the flow path leading to the liquid chamber 107 and increasing the flow energy of the recording liquid toward the liquid emitting port.

However, after the emission of recording liquid droplets, the recording liquid is replenished in the liquid flow path 106 by being pulled thereinto from the liquid chamber 107, by the surface tension of the meniscus of the recording liquid maintained at the liquid emitting port 109. Consequently, since said surface tension of the meniscus can only exert a determined amount of energy, the aforementioned increase of the flow resistance in the liquid flow path 106 inevitably reduces the flow rate of the recording liquid per unit time in the flow path 106. This fact increases the time required for supply of recording liquid into the flow path 106, and deteriorates the frequency response for printing by emission of liquid droplets. The frequency response, or high-speed recording performance, of the liquid jet recording head as shown in FIG. 1 is excellent in comparison to that of other liquid jet recording heads, thermal printers, thermal transfer printers, wire dot printers etc., but is inferior to that of still faster printers such as laser beam printers and electrophotographic copiers. Consequently, it is desired to develop a technology allowing high-speed recording comparable to the performance of such printers.

An important factor in the commercial use of the liquid jet recording head is the dependability and stability of the recording operation after the recording head is left unused for a prolonger period. The above-explained conventional liquid jet recording head, utilizing long and narrow liquid flow paths containing only a small amount of recording liquid in the vicinity of the thermal energy generator, may become unable to emit liquid droplets after a prolonged rest, since the solvent in the recording liquid may evaporate from the liquid emitting port to elevate the viscosity of said recording liquid and the flow resistance thereof in the flow paths. A similar phenomenon may be encountered at a low temperature when the recording liquid becomes more viscous. For this reason it has been proposed to provide the supply system of the recording liquid with a pump to feed the recording liquid of even a high viscosity, or to start the recording operation after various preparatory liquid emissions. However these measures have induced various drawbacks such as increased cost and lowered reliability due to a more complicated mechanism, increased running cost due to the waste of recording liquid, and inability to immediately print due to certain preparatory operations.

SUMMARY OF THE INVENTION

In consideration of the foregoing, an object of the present invention is to provide a liquid jet recording head which is capable of high-speed printing with excellent frequency response, high density and a high image quality, is capable of immediately starting a stable recording operation without a cumbersome operation even after a prolonged pause under any circumstantial conditions, and is adapted for mass production with a relatively low cost.

According to the present invention, there is provided a liquid jet recording head comprising an emitting port for emitting liquid and a liquid path communicating with said emitting port, wherein said liquid path comprises a main liquid path and a subsidiary liquid path, wherein said main liquid path comprises an energy generating member positioned along said main liquid path and designed to generate an energy to be utilized for said liquid emission, and wherein said subsidiary liquid path communicates with said main liquid path at the downstream side of the position of said energy generating member.

BRIEF DESCRIPTION OF THE DRAWINGS

FIGS. 2 to 6 illustrate liquid jet recording heads according to the present invention, wherein.

DETAILED DESCRIPTION OF THE PREFERRED EMBODIMENTS

Now the present invention will be clarified in detail by embodiments thereof shown in the attached drawings.

Figure 2A:
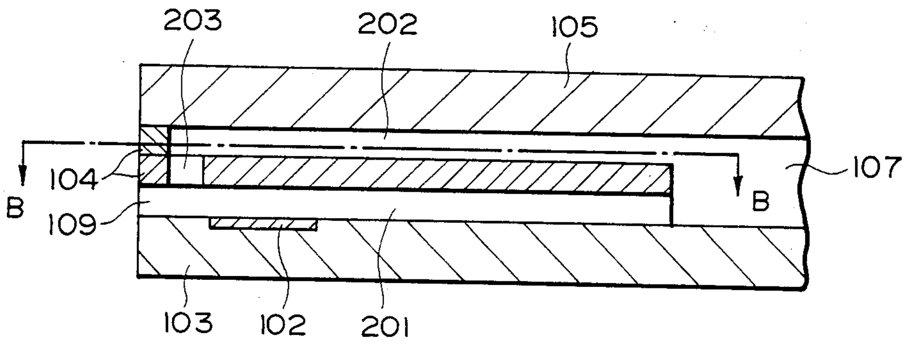
FIGS. 2(A), 3(A), 4(A), 5(A), and 6(A) are schematic cross-sectional views.
Figure 2B:
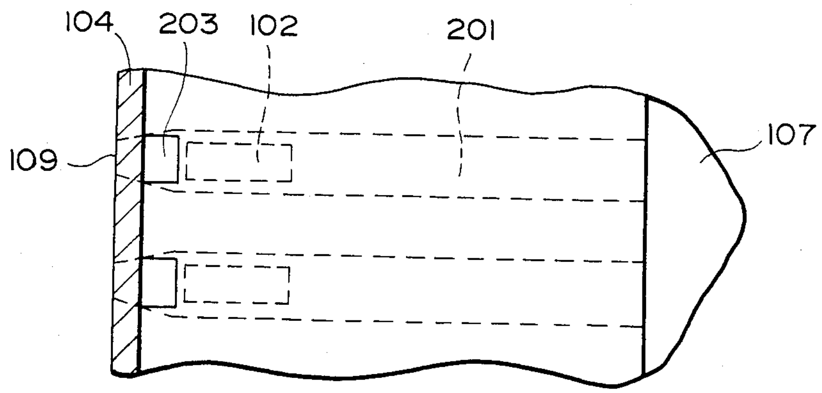
FIGS. 2(B), 3(B), 4(B), 5(B), and 6(B) are cross-sectional views along lines B—B, C—C and D—D, respectively, in said schematic cross-sectional views.

FIG. 2(A) is a schematic cross-sectional view of a head embodiment according to the present invention, and FIG. 2(B) is a cross-sectional view along line B—B in FIG. 2(A). On a substrate 103, bearing thereon an electrothermal converting member 102, there are joined in succession a three-layered wall member 104 and a plate member 105 to form a main liquid path 201, a subsidiary liquid path 202, and a communicating path 203. The recording liquid introduced from a supply entrance 108 into the heas 101 fills a liquid chamber 107, the main liquid path 201, the subsidiary liquid path 202, and the communicating path 203 to form a meniscus at the liquid emitting port 109. In response to an electric power supply to the electrothermal converting member 102 on said substrate 103, the recording liquid is emitted in the form of droplets from the liquid emitting port 109, through the above-explained mechanism. The flow path between the electrothermal converting element 102 and the liquid chamber 107 is designed sufficiently longer than that at the liquid emitting port side, so that the energy of bubble formation on the electrothermal converting element 102 can be effectively utilized for the emission of recording liquid. After liquid emission, the meniscus in a heavily concave form at the liquid emitting port 109 restores itself by surface tension, thus supplying the recording liquid from the main liquid path 201 and communicating path 203 through the subsidiary liquid path 202. However, in the present embodiment, the main flow path 201 is designed longer and has a higher flow resistance, so that the liquid supply is principally made through the subsidiary liquid path 202 and the communicating path 203. In this manner, it is rendered possible to reduce the overall flow resistance, thus increasing the flow rate per unit time and reducing the recovery period of the meniscus, as if the liquid path is shorter.

Also, in a prolonged pause, the increase in viscosity of the recording liquid in the entire liquid path is slower, since the volume of the recording liquid in the vicinity of the liquid emitting port 109 is larger than that in the prior art. Furthermore, in contrast to the conventional structure with a single narrow liquid path from the liquid chamber 107 to the liquid emitting port 109, in which the recording liquid of increased viscosity can hardly diffuse because of the difficulty in conventional circulation between said liquid path and liquid chamber 107, the structure according to the present invention facilitates convection between the main liquid path 201 and the liquid chamber 107, subsidiary liquid path 202 or communicating path 203, thus accelerating the diffusion of the recording liquid of increased viscosity in the vicinity of the liquid emitting port, initiating the recording operation easily and rapidly even after a prolonged pause.

Figure 3A:
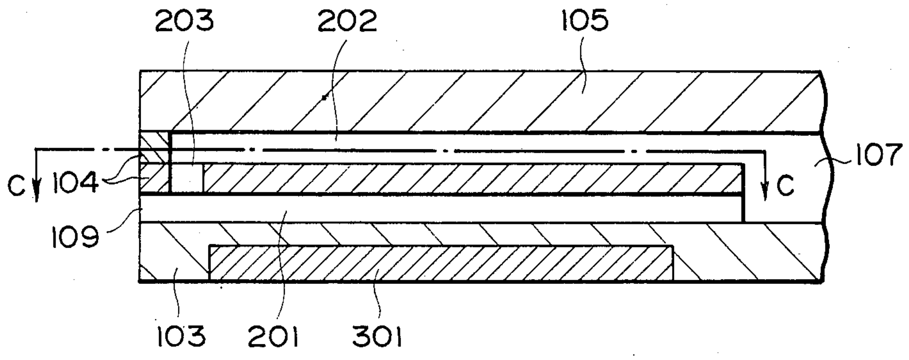
Figure 3B:
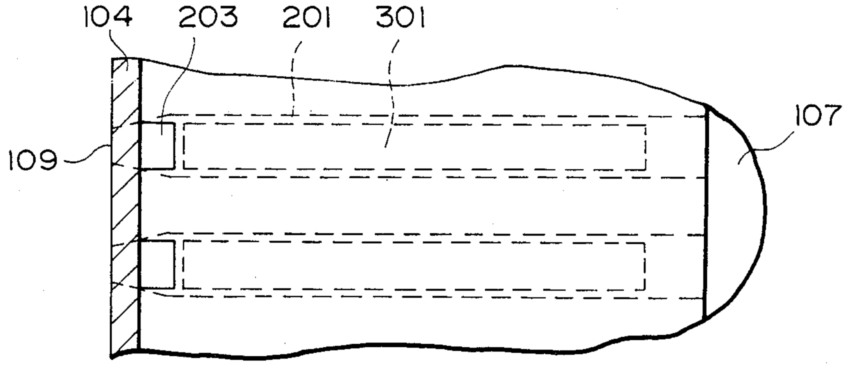

FIG. 3(A) is a schematic cross-sectional view of another head embodiment according to the present invention, and FIG. 3(B) is a schematic cross-sectional view along a line C—C in FIG. 3(A).

A substrate 103 is provided with a piezoelectric elements 301 embedded therein, and three-layered wall members 104 and a plate member 105 are laminated thereon to form main liquid paths 201, subsidiary liquid paths 202, and communicating paths 203. The recording liquid introduced into the head 101 through a liquid supply entrance 108 fills the liquid chamber 107, main liquid path 201, subsidiary liquid path 202, and communicating path 203 and forms a meniscus at a liquid emitting port 109. A piezoelectric element 301 of an oblong rectangular shape is embedded in the substrate 103 for each liquid path and is deformed by electric power supply, whereby the substrate 103 constituting the bottom of the main liquid path 201 is also deformed to reduce the volume therein, thus emitting the recording liquid therein from the liquid emitting port 109 and forming liquid droplets. Since the deformation of the piezoelectric element 301 caused by electric signal is very small per unti area, the piezoelectric element 301 has to occupy a large area in the liquid path in order to emit a desired amount of the recording liquid. It is therefore necessary, in order to achieve a high nozzle density for a fine print quality, to arrange the piezoelectric elements 301 at a small pitch on the substrate. For this reason the piezoelectric element 301 has to be of the above-mentioned oblong rectangular shape, with a correspondingly long liquid path which increases the flow resistance therein and increases the power available for liquid emission. On the other hand, such structure requires a longer time for the replenishment of the recording liquid and therefore has a poor frequency response. However, according to the present invention, the recording liquid is supplied through the subsidiary path 202 and communicating path 203 as shown in FIG. 2 as well as through the main liquid path 201 to the vicinity of the receded meniscus after the liquid emission from the liquid emitting port 109. Consequently such liquid jet recording head shows an overall low flow resistance despite the presence of a long liquid path with a high flow resistance, thus achieving satisfactory frequency response and a sufficiently high emitting power, as if the liquid path is shorter. Also, a stable recording operation can be immediately started after a long pause, as in the foregoing embodiment.

Figure 4A:
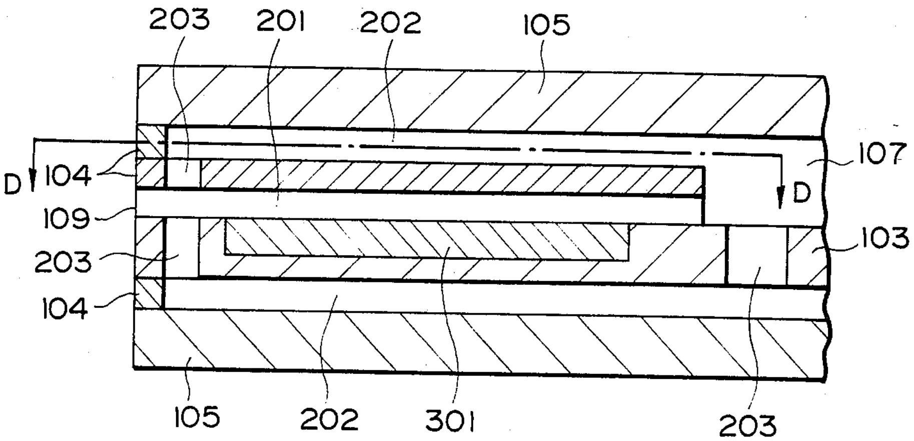
Figure 4B:
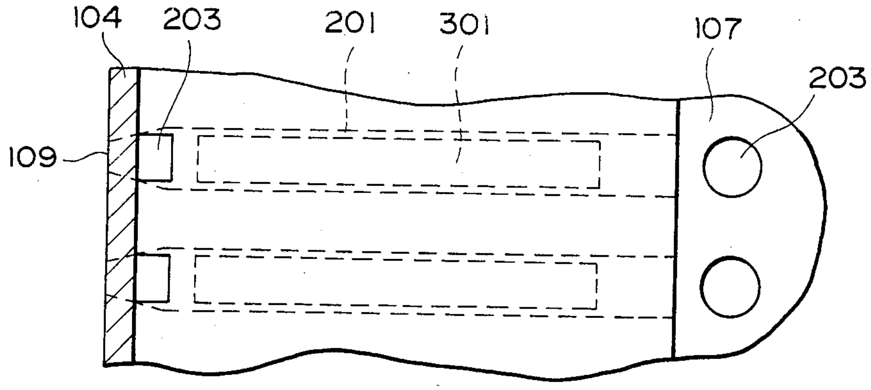

FIG. 4 (A) is a schematic cross-sectional view of another head embodiment according to the present invention, and FIG. 4 (B) is a schematic cross-sectional view along a line D—D shown in FIG. 4 (A).

A substrate 103 is provided with piezoelectric elements 301 embedded therein, and three-layered wall members 104 and a plate member 105 are laminated thereon the form a main liquid path 201, subsidiary liquid paths 202, and communicating paths 203, as in the preceding embodiment. In the present embodiment, other wall members 104 and another plate member 105 are laminated on the bottom side of the substrate 103 to form subsidiary liquid paths 202 and communicating paths 203. In the present embodiment, the recording liquid is emitted from emitting ports 109 by selective electric power supply to the electrodes of the piezoelectric elements 301 (omitted in the drawing), according to the same working principle as in the preceding second embodiment. After the liquid emission, the recording liquid is replenished to the vicinity of the receded meniscus simultaneously through the first-mentioned subsidiary liquid path 202 and communicating path 203 formed by the wall members 104 placed on the substrate 103, through the subsidiary liquid path 202 formed by the wall members 104 and plate member 105 positioned under the substrate 103 and a communicating path 203 formed in the substrate 103 to connect said subsidiary liquid path 202 with the vicinity of the emitting port 109, and through another communicating path 203 communicating said subsidiary liquid path 202 with the liquid chamber 107. Consequently an extremely rapid replenishment of the recroding liquid is rendered possible despite the use of a long main liquid path 201, thus achieving a liquid jet recording head having a satisfactory frequency response and a sufficiently high emitting force.

The liquid path used herein means a path for liquid flow such as an ink tank, a supply pipe from the ink tank to the liquid chamber, a liquid chamber, a main liquid path for supplying liquid from the liquid chamber to the liquid emitting port, a subsidiary liquid path, a communicating path connecting the main liquid path with the subsidiary liquid path, and the like.

In the recording head of the present invention, there should be provided at least one subsidiary liquid path in addition to the main liquid path. Said subsidiary liquid path may be positioned above or below the main liquid path. The communicating port between the subsidiary path and the main path is preferably positioned in the energy generating chamber and/or in the vicinity thereof more preferably in a portion from the emitting port to the energy generating chamber including said chamber itself, and most preferably in a portion from the emitting port to the energy generating chamber, however excluding said chamber itself. The above-mentioned position is desirable in order not only to effectively transmit the energy generated by the energy generating member to the liquid, but also to achieve sufficient liquid supply. For similar reasons the cross section of the communicating port should preferably not exceed twice the cross section of the main liquid path, more preferably the cross section of the main liquid path, and most preferably the cross section of the emitting port. The shapes and dimensions of the subsidiary liquid path and the communicating path can be suitably selected in consideration of the limitations in the manufacture and within a range that will achieve the objects of the present invention in relation to the shapes and dimension of the main liquid path.

Cutting, grinding or casting such as molding are often unable to achieve a high nozzle density and realize fine patterns, and have been an obstacle to mass productivity and cost. However the use of a photosensitive material, for example, a photosensitive resin or glass, for the walls of liquid path provides fine patterns with a satisfactory precision, without significant effect on the productivity.

For the present embodiment there can be employed most of the photosensitive compositions commonly known in the field of photolithography, examples of which are diazo resins, p-diazoquinone, photopolymerizable photopolymers utilizing, for example a vinylic monomer and a polymerization initiator, dimeric photopolymers utilizing for example polyvinyl cinnamate and a sensitizer, a mixture of o-naphthoquinone diazide and novolac-type phenolic resin, polyether type photopolymers obtained by copolymerization for example of 4-glycidylethylene oxide and benzophenone or glycidyl calcone, copolymers of N, N-dimethylmethacrylamide for example with acrylamidebenzophenone, unsaturated polyester type photosensitive resins such as APR supplied by Asahi Chemical Co., Tevista supplied by Teijin Co. or Sonne supplied by Kansai Paint Co., photosensitive resins based on unsaturated urethane oligomers, photosensitive compositions composed of a mixture of a difunctional acrylic monomer, a photopolymerization initiator and a polymer, chromate type photoresists, non-chromic type water-soluble photoresists, polyvinyl cinnamate type photoresists, cyclic rubber-azide photoresists, and the like.

In the present embodiment a subsidiary liquid path is provide for plural main liquid paths, but it is also possible to provide each main liquid path with a subsidiary liquid path or plural subsidiary liquid paths as long as sufficient liquid supply and satisfactory prevention of emitting energy loss are assured. However, in view of the liquid replenishment and ease of manufacture, the subsidiary liquid path should preferably serve plural main liquid paths.

Figure 1A:
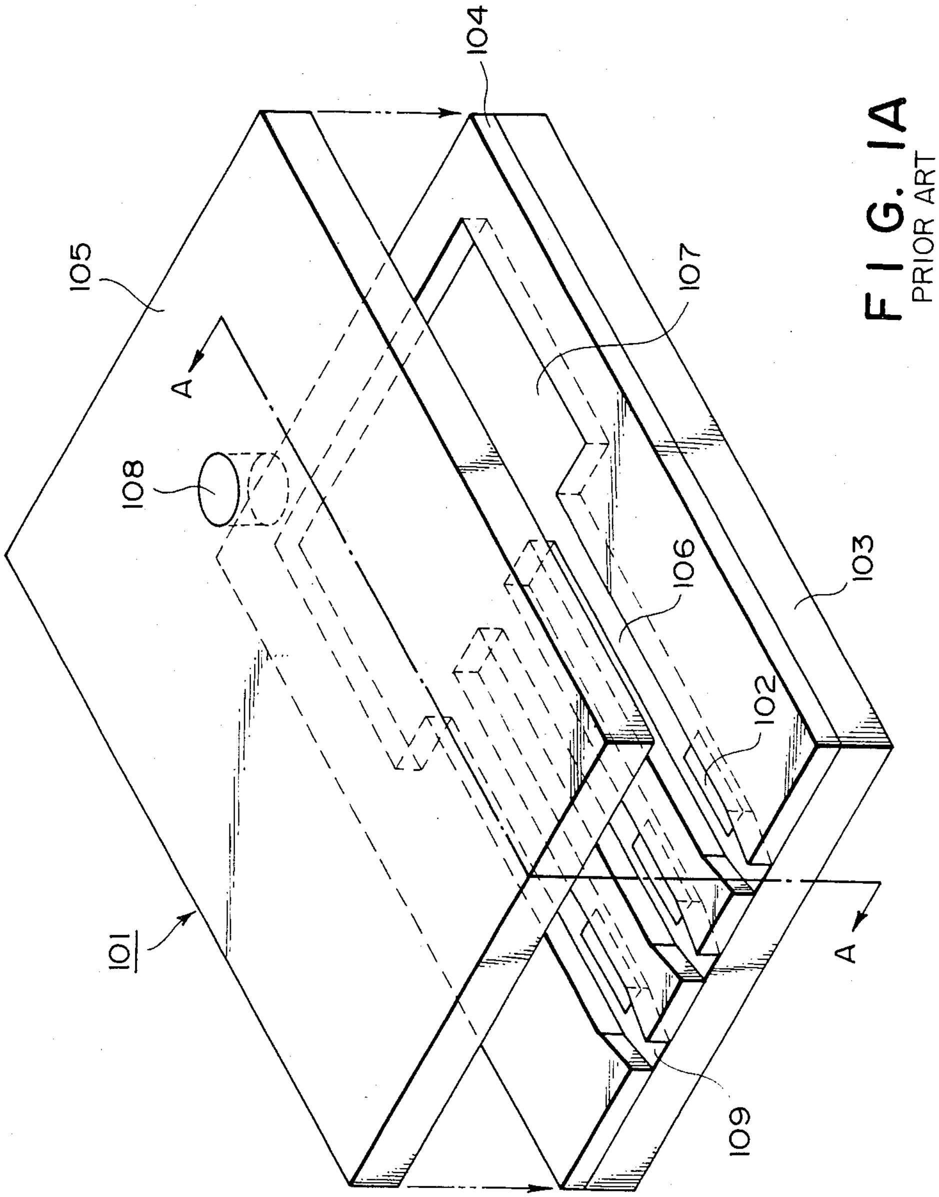
FIG. 1A PRIOR ART
FIG. 1(A) is a schematic perspective view of a conventional liquid jet recording head.
Figure 5A:
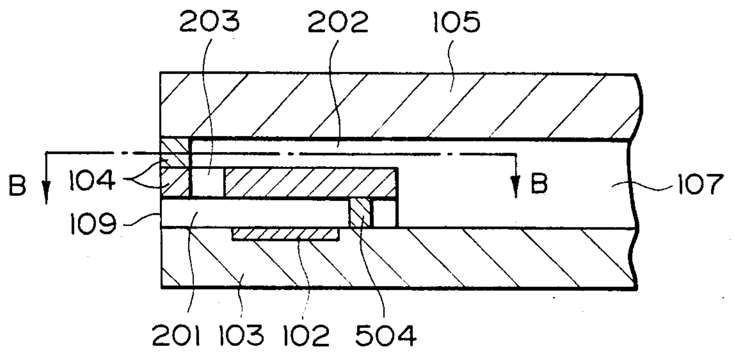
Figure 5B:
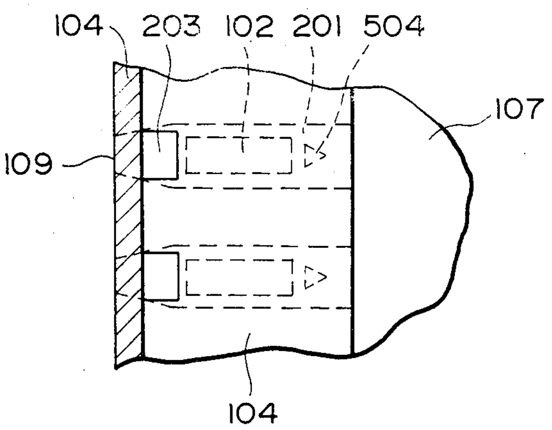

FIG. 5(A) is a schematic cross-sectional view of the nozzle portion of another embodiment of the recording head according to the present invention, and FIG. 5(B) is a cross-sectional view along a line B—B shown in FIG. 5(A). The structure other than the nozzle portion is the same as in the conventional recording head shown in FIG. 1(A). In the present embodiment, as in the foregoing embodiments, theree-layered wall members 104 and a plate member 105 are laminated on a substrate 103 bearing electrothermal converting elements 102 as one of the emitting energy generator, thus forming main liquid paths 201, subsidiary liquid paths 202, and communicating path 203. In the main liquid path 201 of the present embodiment, a flow resistor 504 is provided upstream of said electrothermal converting member 102. The recording liquid supplied into the head through a supply inlet 108 fills the liquid chamber 107, main liquid path 201, subsidiary liquid path 202, and communicating path 203 and forms a meniscus at an emitting port 109. The recording liquid is emitted from said emitting port 109 in the form of flying droplets, in response to the electric power supply to the electrothermal converting element 102 provided on the substrate 103, according to the aforementioned mechanism. After said liquid emission, the meniscus which has significantly receded from the emitting port 109 tends to return to the original position by the surface tension, but the rate of replenishment of the recording liquid into the liquid path depends on the flow resistance therein. Since the frequency response of the liquid emission is determined by the recovery time of the meniscus, it is desirable to reduce the length of the main liquid path 201, in order to reduce the flow resistance therein and to shorten the recovery time of the meniscus. However such shorter liquid path results in a loss in the liquid emitting force, because of a lowered ratio of the flow resistance between the emitting port 109 and energy generating chamber to the flow resistance between said energy generating chamber and liquid chamber 107. Also there may result a mutual interference between neighboring nozzles. In the present embodiment, therefore, there is further provided a flow resistance member 504 between the liquid chamber 107 and the electrothermal converting element 102 in the main liquid path 201, thus increasing the flow resistance at the side of liquid chamber 107 to obtain an effective emitting force at the emitting port 109 and also reducing the mutual interference between neighboring nozzles. Said flow resistance member 504 is formed in such a manner that a low flow resistance is encountered by a downstream flow from the liquid chamber 107 to the main liquid path 201 while a high flow resistance is encountered by an opposite upstream flow, and, in the present embodiment, it is constructed as a triangular pillar as illustrated. Still, the flow resistance to the flow from the liquid chamber 107 toward the main liquid path 201 inevitably becomes higher than in the absence of such flow resistance member. In the present embodiment, therefore, the recording liquid is replenished just upstream of the liquid emitting port 109 through the communicating path 203 and subsidiary liquid path 202 positioned above the main liquid path 201, thus reducing the overall flow resistance for liquid replenishment, shortening the recovery time of the meniscus, and improving the frequency response of the recording liquid droplet emission.

Even after a prolonged pause, the increase in viscosity of the recording liquid in the liquid path due to the solvent evaporation through the emitting port 109 occurs only slowly, since the volume of the recording liquid in the vicinity of the emitting port 109 is larger than in the conventional structure because of the presence of the communciating path 203 and the subsidiary liquid path 202. Additionally, the recording operation after a prolonged pause can be easily and rapidly reopened since the liquid chamber 107, subsidiary liquid path 202, communicating path 203, and main liquid path 201 constitute a relatively small loop to stimulate liquid convection in said loop, thus facilitating the diffusion of any increased viscosity ink in the liquid path back into the liquid chamber 107.

Manufacture of the relatively complicated head with a two layered structure as in the present embodiment has been difficult with the conventional cutting, grinding or mold casting method as it is associated with limitations in obtaining high density of nozzles or fine patterns, in mass productivity and in cost, but such fine complex structure can be precisely realized without significant sacrifice in the mass productivity by utilizing a photosensitive material such as phtosensitive resin or glass as the wall forming material and employing a photolithographic process for forming the liquid paths.

Figure 6A:
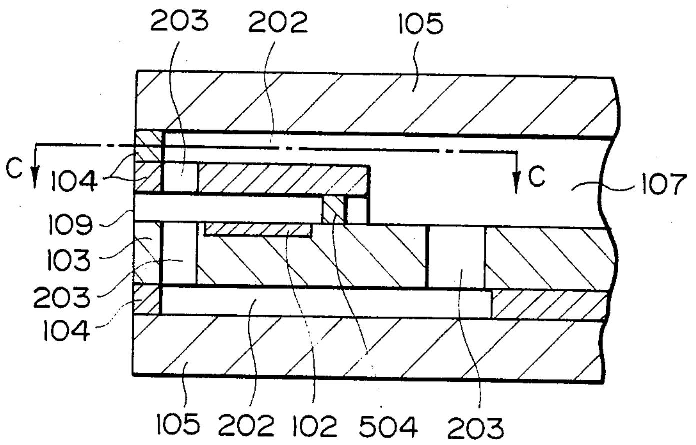
Figure 6B:
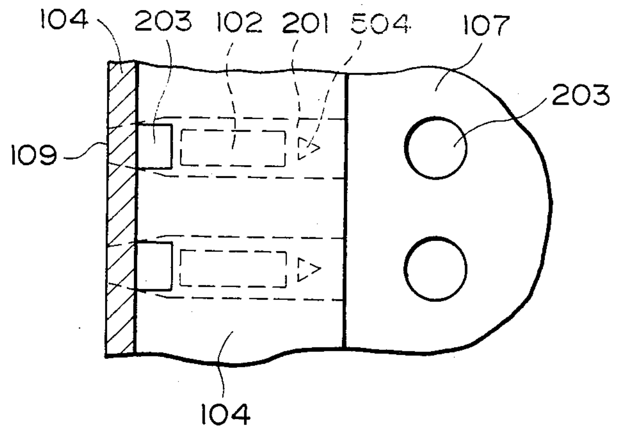

FIG. 6(A) is a schematic cross-sectional view of the nozzle portion of another embodiment according to the present invention, and FIG. 6(B) is a schematic cross-sectional view along a line C—C shown in FIG. 6(A). A substrate 103 is provided thereon with electrothermal converting elements 102 as an emitting energy generator as in the preceding embodiment, and three-layered wall members 104 and a plate member 105 are laminated thereon to form main liquid paths 201, subsidiary liquid paths 202, and communicating paths 203. In the main liquid path 201, there is provided a flow resistance member 504 to prevent a loss in the liquid emitting force and to reduce the mutual interference between the neighboring nozzles. The recording liquid is emitted according to the same principle as in the conventional art and in the foregoing embodiments. In the present embodiment, however, the substrate 103 is provided with holes, i.e. other wall members 104 and a plate member 105 are laminated on the other side of the main liquid path 201 also to form a second subsidiary liquid path 202, whereby the recording liquid is also supplied from the liquid chamber 107 to a position between an emitting port 109 and the electrothermal converting element 102 through the communciating path 203, subsidiary liquid path 202, and communicating path 203. The presence of said second subsidiary liquid path 202 reduces the overall flow resistance in the replenishment of the recording liquid after emission, thus shortening the recovery time of the meniscus and further improving the frequency response of the liquid droplet emission over the preceding embodiment.

Also the liquid emission after a prolonged pause can be achieved extremely dependably and stably due to the reasons explained in the preceding embodiments.

The head of the present embodiment, though being somewhat more complex than the conventional heads, can be relatively easily manufactured with satisfactory precision and with minimum cost increase, and without significant sacrifice in the mass productivity, by employing a photosensitive material for the walls of liquid paths and adopting a photolithographic process.

The subsidiary liquid path of the embodiment shown in FIG. 5 or FIG. 6 is provided on the entire upper or lower face of the main liquid paths like an extension of the liquid chamber, and is not provided with partitions corresponding to the main liquid paths. In other words, the subsidiary liquid path has no partition for each nozzle.

The flow resistance member in the main liquid path need not necessarily be of a triangular pillar structure employed in the preceding embodiment but can be of any shape and dimension that will exhibit a higher flow resistance in an upstream flow and a lower flow resistance in a downstream flow.

Naturally the head of the present embodiment can be manufactured with the same materials and process as in the foregoing embodiments lacking the aforementioned flow resistance member.

As explained in the foregoing, the present invention provides a liquid jet recording head with a high-density nozzle arrangement, which is capable of high-speed recording with a satisfactory frequency response and a satisfactory image quality, and which can immediately initiate stable recording operation without any special procedure after a prolonged pause. The use of a photosensitive material such as photosensitive resin or glass as the material for constituting the liquid paths facilitates fine pattern formation, and the liquid jet recording head capable of stable recording operation with a high image quality can be inexpensively manufactured with a relatively simple process suitable for mass production, through the achievement of a higher packing density of nozzles and formation of liquid paths with a high precision.

EXAMPLES 1-3

A liquid jet recording head, of a structure shown in FIG. 2 and Tab. 1 was prepared with Bercrel 930, which is a photosensitive resin supplied by DuPont, as the material for constituting the liquid paths.

The liquid jet recording head thus prepared was loaded on a liquid jet recording apparatus and was subjected to the tests for frequency response for evaluating the high-speed printing perfomance, and for dependability of recording operation after a prolonged pause.

The frequency response was determined by measuring the maximum frequency allowing stable recording.

The dependability of recording operation after a prolonged pause was evaluated by counting the number of pulses required to restore the liquid emission, after a pause of 12 hours under conditions of 10° C. and 15% RH.

For the purpose of comparison, there was also prepared a liquid jet recording head of a same structure as that of the Example 1, except that the subsidiary liquid paths and communicating paths were omitted (Reference Example 1), and said head was mounted on a liquid jet recording apparatus and evaluated.

Results summarized in Tab. 1 indicate a higher response frequence and a smaller number of pulses before the re-start of emission, after a prolonged pause, in the recording head of the present invention than in the Reference Example.

It will therefore be understood that the liquid jet recording head of the present invention is capable of high-speed recording and provides a dependable recording operation after a prolonged pause.

EXAMPLE 4

A liquid jet recording head of a structure shown in FIG. 2 was prepared with Bercrel 930, a photosensitive resin supplied by DuPont, as the material for constituting the liquid paths.

The liquid jet recording head thus prepared was loaded on a liquid jet recording apparatus and was subjected to the tests for frequency response for evaluating the high-speed pring performance, and for dependability of recording operation after a prolonged pause.

The liquid jet recording head thus prepared and another liquid jet recording head of a same structure as in the Example 2 but lacking the subsidiary liquid path and communciating path (Reference Example 2) were mounted on liquid jet recording apparatuses, respectively, and were tested for frequency response and dependability of recording operation after a prolonged pause, in the same manner as in Example 1.

Results summarized in Tab. 1 indicate a higher response frequency and a smaller number of pulses before the re-start of emission, after a prolonged pause, in the recording head of the present invention than in the Reference Example 2.

It will therefore be understood that the liquid jet recording head of the present invention is capable of high-speed recording and provides a dependable recording operation after prolonged pause.

EXAMPLE 5

A liquid jet recording head of a structure shown in FIG. 3 was prepared with Bercrel 930, a photosensitive resin supplied by DuPont, as the material for constituting the liquid paths.

The liquid jet recording head thus prepared was mounted on a liquid jet recording apparatus and subjected to the tests for frequency response and for dependability recording operation after a prolonged pause, in the same manner as in Example 1.

Results summarized in Tab. 1 indicate that the liquid jet recording head of the present invention is capable of high-speed recording and allows dependable recording operation after prolonged pause.

TABLE 2

(unit: mm)

| | Main liquid path | | | | | First subsidiary liquid path | | | Communicating path between first subsidiary liquid path and main liquid path | | | | |
|---|---|---|---|---|---|---|---|---|---|---|---|---|---|
| | Total Length | Distance from outlet of liquid chamber to energy generating chamber | Length of energy generating chamber | Width | Length | Total Length | Width | Height | Length | Width | Height | Position | Distance from liquid chamber |
| Example 1 | 1.0 | 0.78 | 0.12 | 0.09 | 0.07 | 0.95 | total width | 0.07 | 0.04 | 0.07 | 0.07 | between orifice and energy generator | 0.91 |
| Example 2 | 1.0 | 0.78 | 0.12 | 0.09 | 0.07 | 0.95 | total width | 0.07 | 0.04 | 0.07 | 0.07 | above energy generator | 0.82 |
| Example 3 | 1.0 | 0.78 | 0.12 | 0.09 | 0.07 | 0.95 | total width | 0.07 | 0.04 | 0.07 | 0.07 | upstream of energy generator | 0.04 |
| Example 4 | 2.0 | 0 | 1.78 | 0.09 | 0.07 | 1.95 | total width | 0.07 | 0.04 | 0.07 | 0.07 | — | |
| Example 5 | 2.0 | 0 | 1.76 | 0.09 | 0.07 | 1.95 | total width | 0.07 | 0.04 | 0.07 | 0.07 | — | |
| Ref. Ex. 1 | 1.0 | 0.78 | 0.12 | 0.09 | 0.07 | — | | — | — | — | — | — | |
| Ref. Ex. 2 | 2.0 | 0 | 1.78 | 0.09 | 0.07 | — | | — | — | — | — | — | |

| Second subsidiary liquid path | Communicating paths between second subsidiary liquid path and main liquid path | | | |
|---|---|---|---|---|
| Total | Communicating path at liquid chamber | Communicating path at emitting port | Response frequency | Number of pulses before emission |

TABLE 2-continued

| | length | Width | Height | Shape | Diameter | Height | Length | Width | Height | (kHz) | after pause |
|---|---|---|---|---|---|---|---|---|---|---|---|
| Example 1 | — | — | — | — | — | — | — | — | — | 10.8 | 1 |
| Example 2 | — | — | — | — | — | — | — | — | — | 7.9 | 1 |
| Example 3 | — | — | — | — | — | — | — | — | — | 7.0 | 1 |
| Example 4 | — | — | — | — | — | — | — | — | — | 5.6 | 0 |
| Example 5 | 2.2 | total width | 0.07 | cylindrical | 0.1 | 0.8 | 0.04 | 0.07 | 0.8 | 9.4 | 0 |
| Ref. Ex. 1 | — | — | — | — | — | — | — | — | — | 3.2 | 1300 |
| Ref. Ex. 2 | — | — | — | — | — | — | — | — | — | 1.4 | 2100 |

EXAMPLES 6 AND 7

Figure 1B:
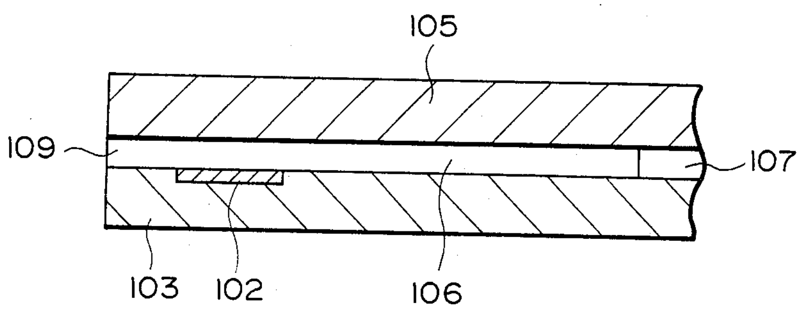
FIG. 1B PRIOR ART
FIG. 1(B) is a cross-sectional view along a line A—A in FIG. 1(A)

Liquid jet recording heads of structures shown in FIG. 5 (example 6) and FIG. 6 (example 7) were prepared by a photolithographic process, utilizing Bercrel 930, a photosensitive resin manufactured by DuPont, as the material for constituting the main liquid path, subsidiary liquid path, and resistance member. Also a recording head of a structure shown in FIG. 1 (reference example 3) was prepared with a similar method.

Tab. 2 summarizes the dimensions of the recording heads of the above-mentioned examples and reference example 3.

In the above examples, the communciating path is positioned within a range from the emitting port to a position just outside the energy generating chamber as shown in FIGS. 5 and 6. It has been found that a response frequency even higher than that in the foregoing examples 1 to 5, can be obtained if the communciating path with the first subsidiary liquid path is positioned right at the energy generating chamber. In fact recording heads corresponding to Examples 6 and 7 respectively provided response frequencies of 10.4 and 11.7 kHz.

What is claimed is:

1. A liquid jet recording head comprising a liquid emitting port for liquid emission and liquid paths, including plural main liquid paths and a subsidiary liquid path common to said main liquid paths, communicating with said liquid emitting port, wherein:

an energy generating member is positioned along each said main liquid path for generating energy to be utilized for liquid emission, said subsidiary liquid path communicates with said main liquid paths at positions thereof downstream of said energy generating members, said main liquid paths and said subsidiary liquid path are connected to a common liquid chamber, and a first surface forms an interior wall of said main liquid path and a second surface opposing said first surface forms an interior wall of said subsidiary liquid path, said first and second surfaces forming opposing surfaces of said liquid chamber, the height of which is thereby approximately equal to the distance between said first and second surfaces.

2. A liquid jet recording head according to claim 1, wherein said main liquid paths and subsidiary liquid path are formed by a photosensitive material.

TABLE 2

(unit: mm)

| | Main liquid path | | | | | Resistance member | | |
|---|---|---|---|---|---|---|---|---|
| | Total length | Distance from exit of liquid chamber to energy generating chamber | Length of energy generating chamber | Width | Height | Shape | Length of a side of triangle | Distance from exit of liquid chamber to center of resistance member |
| Example 6 | 0.3 | 0.08 | 0.12 | 0.09 | 0.07 | Regular triangular pillar | 0.03 | 0.07 |
| Example 7 | 0.3 | 0.08 | 0.12 | 0.09 | 0.07 | ibid. | 0.03 | 0.07 |
| Ref. Ex. 3 | 1.0 | 0.78 | 0.12 | 0.09 | 0.07 | — | — | — |

| | First subsidiary liquid path | | | | | Second subsidiary liquid path | | Communicating path at liquid chamber | | | Communicating path at emitting ports | | |
|---|---|---|---|---|---|---|---|---|---|---|---|---|---|
| | | | Communicating path | | | | | | | | | | |
| | Total length | Height | Length | Width | Height | Total length | Height | Shape | Diameter | Height | Length | Width | Height |
| Example 6 | 0.25 | 0.07 | 0.04 | 0.07 | 0.07 | — | — | — | — | — | — | — | — |
| Example 7 | 0.25 | 0.07 | 0.04 | 0.07 | 0.07 | 0.5 | 0.07 | cylindrical | 0.1 | 0.4 | 0.04 | 0.07 | 0.4 |
| Ref. Ex. 3 | — | — | — | — | — | — | — | — | — | — | — | — | — |

These three recording heads were mounted on liquid jet recording apparatuses, respectively, and were subjected to tests for frequency response, indicating the high-speed printing performance, and the dependability of the recording operation after a prolonged pause. More specifically, there were condcuted the measurement of the response frequency, or maximum frequency allowing stable recording, and the measurement of number of pulses required before the liquid emission was started again, after a pause of 12 hours at 10° C., 15% R.H. The obtained results are summarized in Tab. 3.

TABLE 3

| | Response frequency (kHz) | Number of pulses required before reemission after a pause of 12 hrs at 10° C., 15% RH |
|---|---|---|
| Example 6 | 13.0 | 0 |
| Example 7 | 14.6 | 0 |
| Ref. Ex. 3 | 3.2 | 1300 |

3. A liquid jet recording head according to claim 2, wherein said photosensitive material is a photosensitive resin.

4. A liquid jet recording head according to claim 2, wherein said photosensitive material is a photosensitive glass.

5. A liquid jet recording head according to claim 1, wherein each said main liquid path and said subsidiary liquid path communicate with each other in a range of each said main liquid path from the liquid emitting port thereof to the energy generating element thereof.

6. A liquid jet recording head according to claim 1, wherein each said energy generating member is an electrothermal converting member.

7. A liquid jet recording head according to claim 1, wherein each said energy generating member is an electromechanical converting member.

8. A liquid jet recording head according to claim 1, wherein each said main liquid path comprises a liquid resistance member showing a higher resistance to the upstream flow of the liquid and a lower resistance to the downstream flow of the liquid.

9. A liquid jet recording head according to claim 8, wherein said main liquid paths, subsidiary liquid path, and flow resistance members are formed by a photosensitive material.

10. A liquid jet recording head according to claim 9, wherein said photosensitive material is a photosensitive resin.

11. A liquid jet recording head according to claim 9, wherein said photosensitive material is a photosensitive glass.

12. A liquid jet recording head according to claim 1, wherein said subsidiary liquid path is above said main liquid paths.

* * * * *

UNITED STATES PATENT AND TRADEMARK OFFICE

CERTIFICATE OF CORRECTION

PATENT NO. : 4,723,136

DATED : February 2, 1988

INVENTOR(S) : MASAMICHI SUZUMURA

It is certified that error appears in the above-identified patent and that said Letters Patent is hereby corrected as shown below:

COLUMN 1

Line 38, "into" should read --in--.

COLUMN 2

Line 36, "prolonger" should read --prolonged--.

COLUMN 3

Line 41, "heas 101" should read --head 101--.

COLUMN 4

Line 9, "conventional" should read --convectional--.
Line 41, "unti" should read --unit--.

COLUMN 5

Line 6, "the" should read --to--.
Line 30, "recroding" should read --recording--.
Line 50, "thereof" should read --thereof,--.

COLUMN 6

Line 48, "theree-layered" should read --three-layered--.

COLUMN 7

Line 27, "the flow" should read --the liquid flow--.
Line 54, "two layered" should read --two-layered--.

UNITED STATES PATENT AND TRADEMARK OFFICE
CERTIFICATE OF CORRECTION

PATENT NO. : 4,723,136

DATED : February 2, 1988

INVENTOR(S) : MASAMICHI SUZUMURA

It is certified that error appears in the above-identified patent and that said Letters Patent is hereby corrected as shown below:

COLUMN 9

Line 28, "frequence" should read --frequency--.
Line 41, "TABLE 2" should read --TABLE 1--.

COLUMN 10

Line 6, "pring" should read --printing--.
Line 34, "recording" should read --of recording the--.
Line 39, "prolonged" should read --a prolonged--.

COLUMN 11

Line 1, "TABLE 2-continued" should read --TABLE 1-continued--.
Line 52, "condcuted" should read --conducted--.
Line 53, "the" should be deleted.
Line 55, "number" should read --the number--.

Column 12

Line 17, "communciating" should read --communicating--.

Signed and Sealed this

Ninth Day of August, 1988

*Attest:*

DONALD J. QUIGG

*Attesting Officer*

*Commissioner of Patents and Trademarks*